United States Patent
Hong et al.

(10) Patent No.: US 10,609,287 B2
(45) Date of Patent: *Mar. 31, 2020

(54) STABILIZING VIDEO

(71) Applicant: Google LLC, Mountain View, CA (US)

(72) Inventors: Wei Hong, Sunnyvale, CA (US);
Rodrigo Carceroni, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/513,123

(22) Filed: Jul. 16, 2019

(65) Prior Publication Data
US 2019/0342496 A1 Nov. 7, 2019

Related U.S. Application Data

(63) Continuation of application No. 15/942,983, filed on Apr. 2, 2018, now Pat. No. 10,375,310, which is a continuation of application No. 14/883,515, filed on Oct. 14, 2015, now Pat. No. 9,967,461.

(51) Int. Cl.
*H04N 5/232* (2006.01)
*G06T 3/00* (2006.01)
(Continued)

(52) U.S. Cl.
CPC ....... *H04N 5/23248* (2013.01); *G06T 3/0093* (2013.01); *G06T 5/003* (2013.01);
(Continued)

(58) Field of Classification Search
CPC ......... H04N 5/232248; H04N 5/23229; H04N 5/23296; G06T 7/246; G06T 5/003; G06T 5/10; G06T 5/20; G06T 3/0093
See application file for complete search history.

(56) References Cited

U.S. PATENT DOCUMENTS

| 4,637,571 A | 1/1987 | Holder et al. |
| 5,053,876 A | 10/1991 | Blissett et al. |

(Continued)

FOREIGN PATENT DOCUMENTS

| EP | 1577836 | 3/2014 |
| RU | 2013114208 A | 10/2014 |
| WO | WO 2011/046710 | 4/2011 |

OTHER PUBLICATIONS

"Homography (computer vision)," From Wikipedia, the free encyclopedia, last modified on Sep. 17, 2015 [retrieved on Oct. 13, 2015]. Retrieved from the Internet: URL<https://en.wikipedia.org/wiki/Homography_(computer_vision)>, 3 pages.

(Continued)

*Primary Examiner* — Antoinette T Spinks
(74) *Attorney, Agent, or Firm* — Fish & Richardson P.C.

(57) ABSTRACT

In general, the subject matter can be embodied in methods, systems, and program products for identifying, by a computing system and using first and second frames of a video, a transformation that indicates movement of a camera with respect to the frames. The computing system generates a modified transformation so that the transformation is less representative of recent movement. The computing system uses the transformation and the modified transformation to generate a second transformation. The computing system identifies an anticipated distortion that would be present in a stabilized version of the second frame. The computing system determines an amount by which to reduce a stabilizing effect. The computing system applies the second transformation to the second frame to stabilize the second frame, where the stabilizing effect has been reduced based on the determined amount by which to reduce the stabilizing effect.

20 Claims, 4 Drawing Sheets

(51) Int. Cl.
　　　G06T 5/00　　　(2006.01)
　　　G06T 7/246　　(2017.01)
　　　G06T 5/10　　　(2006.01)
　　　G06T 5/20　　　(2006.01)
(52) U.S. Cl.
　　　CPC .................. *G06T 5/10* (2013.01); *G06T 5/20* (2013.01); *G06T 7/246* (2017.01); *H04N 5/23229* (2013.01); *H04N 5/23296* (2013.01); *G06T 2207/10016* (2013.01)

(56) References Cited

U.S. PATENT DOCUMENTS

| | | | |
|---|---|---|---|
| 6,239,811 | B1 | 5/2001 | Westwater |
| 7,697,725 | B2 | 4/2010 | Burns et al. |
| 7,944,482 | B2 * | 5/2011 | Tani ............... H04N 5/23254 348/222.1 |
| 8,009,872 | B2 | 8/2011 | Kurata |
| 8,493,459 | B2 | 7/2013 | Albu |
| 9,967,461 | B2 | 5/2018 | Hong et al. |
| 2002/0145610 | A1 | 10/2002 | Westwater |
| 2003/0038927 | A1 | 2/2003 | Alden |
| 2004/0036844 | A1 | 2/2004 | Wood |
| 2008/0174822 | A1 | 7/2008 | Kaimi |
| 2011/0032430 | A1 * | 2/2011 | Prieto ............... G09G 3/3406 348/687 |
| 2013/0121597 | A1 | 5/2013 | Hsu |

OTHER PUBLICATIONS

"Image stabilization," From Wikipedia, the free encyclopedia, last modified on Sep. 28, 2015 [retrieved on Oct. 13, 2015]. Retrieved from the Internet: URL<https://en.wikipedia.org/wiki/Image_stabilization#Optical_image_stabilization>, 4 pages.

"Infinite impulse response," From Wikipedia, the free encyclopedia, last modified on Sep. 7, 2015 [retrieved on Oct. 13, 2015]. Retrieved from the Internet: URL<https://en.wikipedia.org/wiki/Infinite_impulse_response>, 4 pages.

Baker et al., "Removing Rolling Shutter Wobble," Proceedings of the IEEE Conference on Computer Vision and Pattern Recognition, Jun. 2010, pp. 2392-2399.

Crawford et al., "Gradient Based Dominant Motion Estimation with Integral Projections for Real Time Video Stabilisation," 2004 International Conference on Image Processing (ICIP), vol. 5, pp. 3371-3374, Oct. 2004.

Grundmann et al., "Video Stabilization on YouTube," Google Research Blog, May 4, 2012 [retrieved on Oct. 13, 2015]. Retrieved from the Internet: URL<http://googleresearch.blogspot.de/2012/05/video-stabilization-on-youtube.html>, 7 pages.

Hartley and Zisserman, "Multiple View Geometry in Computer Vision, Second Edition," Cambridge University Press, 2003, pp. 91-112 only.

International Preliminary Report on Patentability issued in International Application No. PCT/US2016/053252, dated Apr. 26, 2018, 9 pages.

International Search Report and Written Opinion in International Application No. PCT/US2016/053252, dated Dec. 23, 2016, 14 pages.

Koppel et al., Robust and Real-Time Image Stabilization and Rectification, Application of Computer Vision, 2005. WACV/Motions '05 vol. 1. Seventh IEEE Workshops on, Jan. 2005, pp. 350-355.

Lavry, "Understanding IIR (Infinite Impulse Response) Filters—An Intuitive Approach," Lavry Engineering, 1997, 5 pages.

Liu and Jin, "Content-Preserving Warps for 3D Video Stabilization," ACM Transactions on Graphics (TOG)—Proceedings of ACM SIGGRAPH 2009, vol. 28, Issue 3, Article No. 44, Aug. 2009, pp. 1-9.

Liu et al. "Bundled camera paths for video stabilization," ACM Transactions on Graphics, vol. 32, Jul. 11, 2013, 10 pages.

Rawat and Singhai, "Review of Motion Estimation and Video Stabilization techniques For hand held mobile video," Signal & Image Processing: An International Journal (SIPIJ) 2(2):159-168, Jun. 2011.

Roth, "Homography," ECCD, COMP 4900, Class Note, Fall 2009, 22 pages.

RU Office Action issued in Russian Application No. 2018100943, dated Oct. 5, 2018, 4 pages (English translation).

Tian and Narasimhan, "Globally Optimal Estimation of Nonrigid Image Distortion," International journal of computer vision, 98(3):279-302, Jul. 2012.

Unknown Author, "The Homography transformation," CorrMap, 2013 [retrieved on Oct. 13, 2015]. Retrieved from the Internet: URL<http://www.corrmap.com/features/homography_transformation.php>, 5 pages.

Wilkie, "Motion stabilisation for video sequences," Imperial College London, Department of Computing, Final Year Project, Jun. 18, 2003, 63 pages.

Won-Ho Cho et al. "CMOS Digital Image Stabilization," IEEE Transactions on Consumer Electronics, IEEE Service Center, New York, NY, US, vol. 53 No. 3, Aug. 1, 2007, pp. 979-986.

* cited by examiner

STABILIZING VIDEO

CROSS-REFERENCE TO RELATED APPLICATIONS

This application is a continuation of and claims priority to U.S. application Ser. No. 15/942,983, filed on Apr. 2, 2018, which is a continuation of and claims priority to U.S. application Ser. No. 14/883,515, filed on Oct. 14, 2015, the entire contents of which are hereby incorporated by reference.

TECHNICAL FIELD

This document generally relates to stabilizing video.

BACKGROUND

Video recording used to be the domain of dedicated video recording devices, but it is more common to find everyday devices such as cellular telephones and tablet computers that are able to record video. An issue with most handheld recording devices is that these devices suffer from video shake, in which a user's involuntary movements while holding the recording device affects a quality of the video.

Shaking the recording device can result in an equally-shaky video unless that shaking is compensated, for example, by a video stabilization mechanism. Optical video stabilization can decrease the shaking present in video by mechanically moving components of the recording device, such as a lens or the image sensor. Optical video stabilizing devices, however, may add to the material and manufacturing costs of a recording device. Moreover, optical video stabilization devices may add to the size of a recording device, and there is often a desire to design recording devices to be small.

SUMMARY

This document describes techniques, methods, systems, and other mechanisms for stabilizing video.

As additional description to the embodiments described below, the present disclosure describes the following embodiments.

Embodiment 1 is a computer-implemented method. The method comprises receiving, by a computing system, first and second frames of a video that was captured by a recording device. The method comprises identifying, by the computing system and using the first and second frames of the video, a mathematical transformation that indicates movement of the camera with respect to a scene captured by the video from when the first frame was captured to when the second frame was captured. The method comprises generating, by the computing system, a modified mathematical transformation by modifying the mathematical transformation that indicates the movement of the camera with respect to the scene, so that the mathematical transformation is less representative of movement that began recently. The method comprises generating, by the computing system using the mathematical transformation and the modified mathematical transformation, a second mathematical transformation that is able to be applied to the second frame to stabilize the second frame. The method comprises identifying, by the computing system, an anticipated distortion that would be present in a stabilized version of the second frame resulting from application of the second mathematical transformation to the second frame, based on a difference between: (i) an amount of distortion in the horizontal direction resulting from application of the second mathematical transformation to the second frame, and (ii) an amount of distortion in the vertical direction resulting from application of the second mathematical transformation to the second frame. The method comprises determining, by the computing system, an amount by which to reduce a stabilizing effect that results from application of the second mathematical transformation to the second frame, based on a degree to which the anticipated distortion exceeds an acceptable change in distortion that was calculated from distortion in multiple frames of the video that preceded the second frame. The method comprises generating, by the computing system, the stabilized version of the second frame by applying the second mathematical transformation to the second frame, where a stabilizing effect of applying the second mathematical transformation to the second frame has been reduced based on the determined amount by which to reduce the stabilizing effect.

Embodiment 2 is the method of embodiment 1, wherein the second frame is a frame of the video that immediately follows the first frame of the video.

Embodiment 3 is the method of embodiment 1, wherein the mathematical transformation that indicates movement of the camera includes a homography transform matrix.

Embodiment 4 is the method of embodiment 3, wherein modifying the mathematical transformation includes applying a lowpass filter to the homography transform matrix.

Embodiment 5 is the method of embodiment 3, wherein the anticipated distortion is based on a difference between a horizontal zoom value in the second mathematical transformation and a vertical zoom value in the second mathematical transformation.

Embodiment 6 is the method of embodiment 1, wherein modifying the mathematical transformation includes modifying the mathematical transformation so that the modified mathematical transformation is more representative of movement that has been occurring over a long period of time than the mathematical transformation.

Embodiment 7 is the method of embodiment 1, wherein determining the amount by which to reduce the stabilizing effect that results from application of the second mathematical transformation to the second frame is further based on a determined speed of movement of the camera from the first frame to the second frame exceeding an acceptable change in speed of movement of the camera that was calculated based on a speed of movement of the camera between multiple frames of the video that preceded the second frame.

Embodiment 8 is the method of embodiment 1, wherein generating the stabilized version of the second frame includes zooming into a version of the second frame that was generated by applying the second mathematical transformation to the second frame.

Embodiment 9 is the method of embodiment 1, wherein the operations further comprise shifting a zoomed-in region of the version of the second frame horizontally or vertically to avoid the zoomed-in region of the second frame from presenting an invalid region.

Embodiment 10 is directed to a system including a recordable media having instructions stored thereon, the instructions, when executed by one or more processors, cause performance of operations according to the method of any one of embodiments 1 through 9.

Particular implementations can, in certain instances, realize one or more of the following advantages. Video stabilization techniques described herein can compensate for movement in more than two degrees of freedom (e.g., more than just horizontal and vertical movement), for example, by compensating for movement in eight degrees of freedom (e.g., translation aspects, rotation aspects, zooming aspects, and non-rigid rolling shutter distortion). The video stabilization techniques described herein can operate as video is being captured by a device and may not require information from future frames. In other words, the video stabilization techniques may be able to use information from only past frames in stabilizing a most-recently-recorded frame, so that the system can store a stabilized video stream as that video stream is captured (e.g., without storing multiple unstabilized video frames, such as without storing more than 1, 100, 500, 1000, or 5000 unstabilized video frames in a video that is being currently recorded or that has been recorded). Accordingly, the system may not need to wait to stabilize a video until after the entire video has been recorded. The described video stabilization techniques may have low complexity, and therefore may be able to run on devices that have modest processing power (e.g., some smartphones). Moreover, the video stabilization techniques described herein may be able to operate in situations in which the frame-to-frame motion estimation fails in the first step.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes stabilizing video. The video stabilization may be performed by identifying a transformation between a most-recently-received frame of video and a previously-received frame of a video (where the transformation indicates movement of the camera with respect to a scene from frame to frame), modifying that transformation based on information from past frames, generating a second transformation based on the transformation and the modified transformation, and applying the second transformation to the currently-received frame to generate a stabilized version of the currently-received frame. This process is described generally with respect to FIG. 1, and then with greater detail with respect to FIG. 2.

Figure 1:
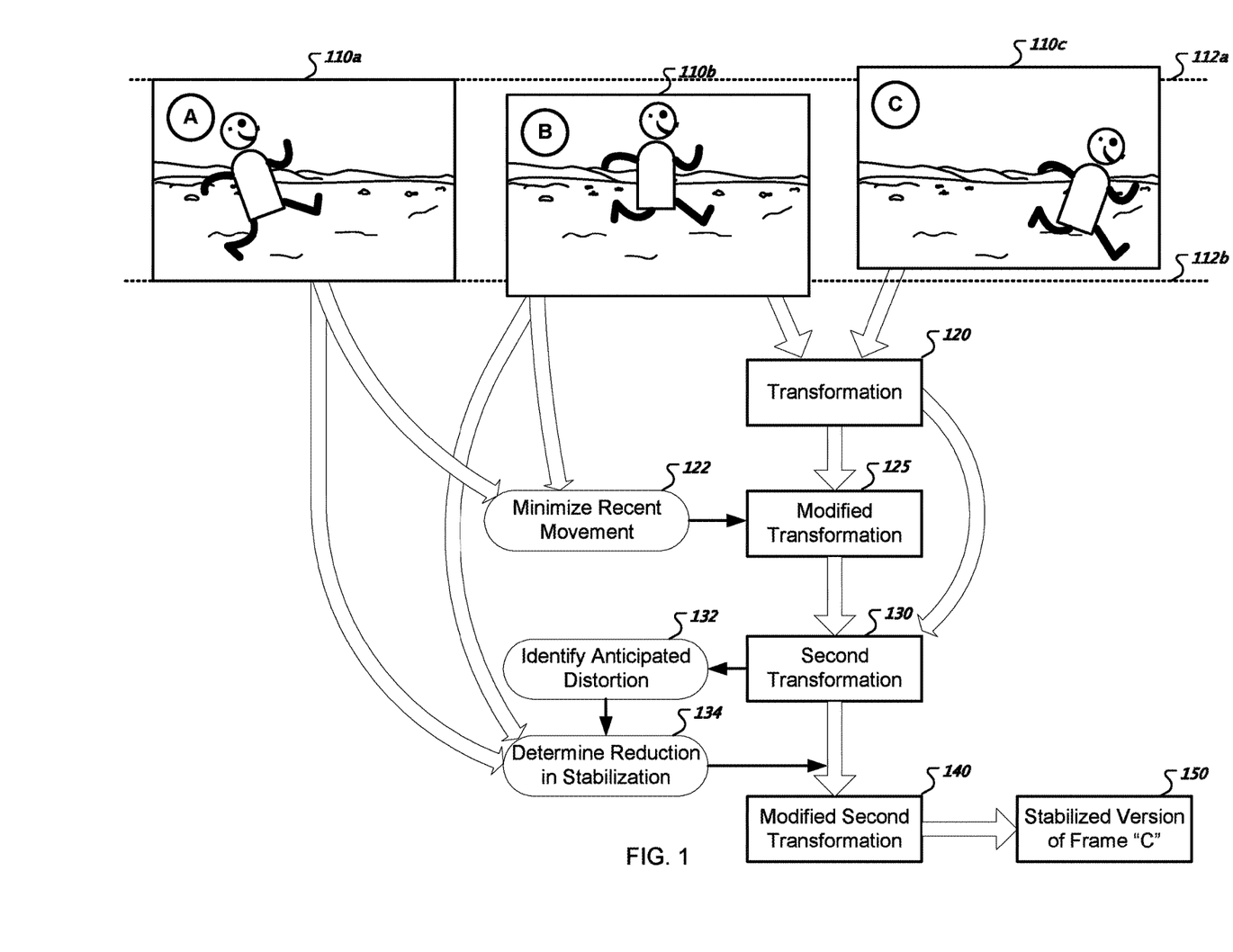
FIG. 1 shows a diagram of a video stream that is being stabilized by a video stabilization process.
Figure 2A:
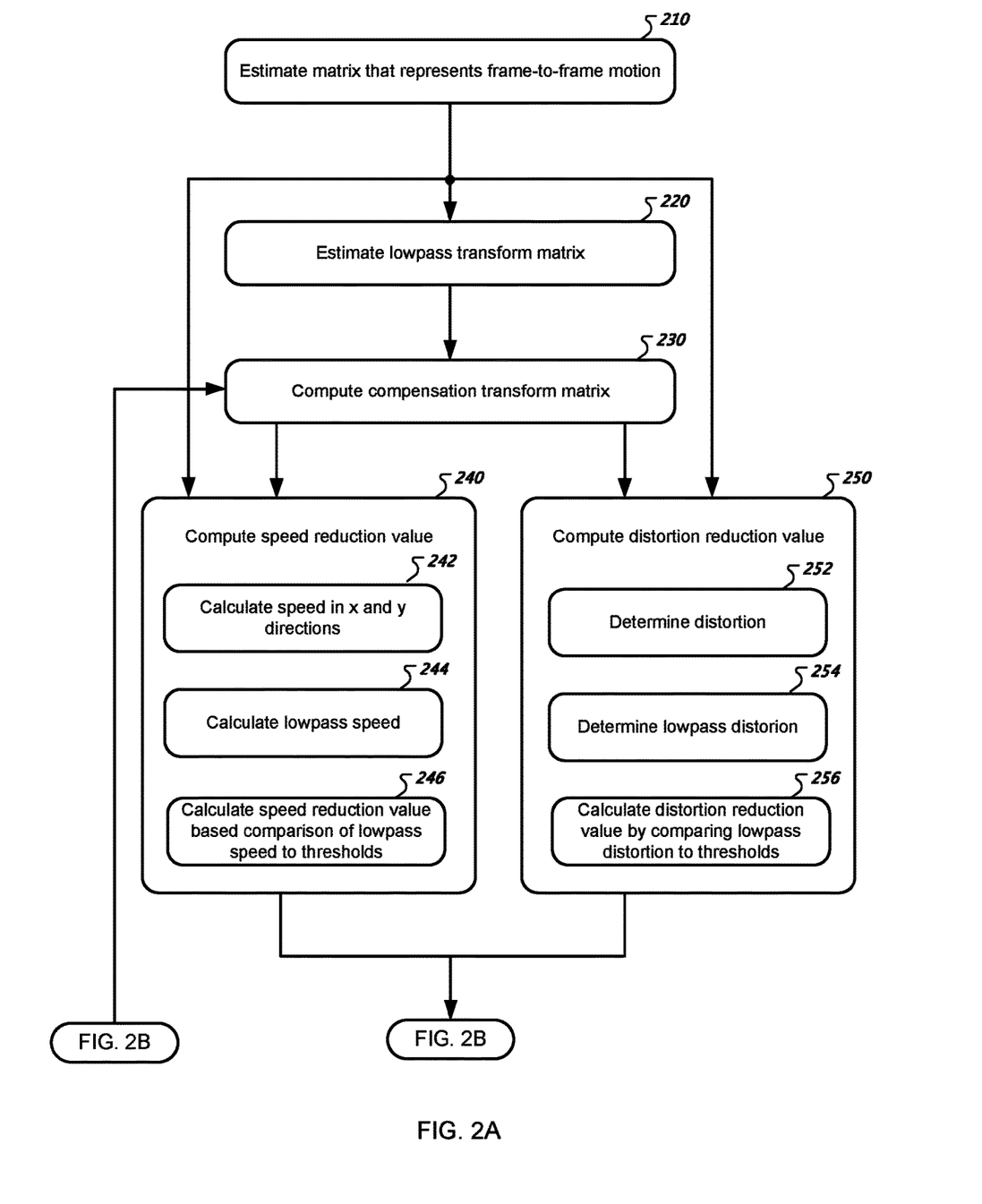
FIGS. 2A-2B show a flowchart of a process for stabilizing video.
Figure 2B:
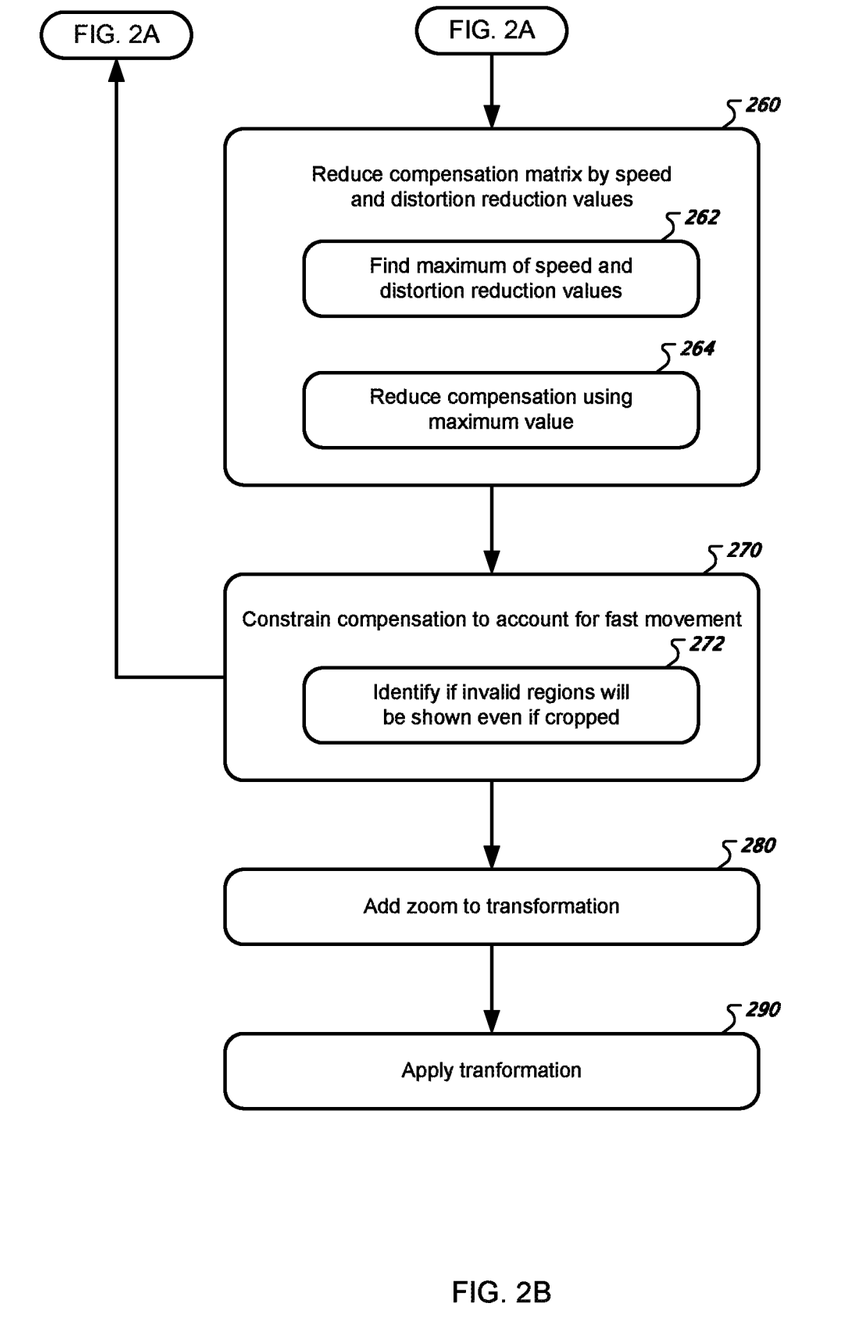

FIG. 1 shows a diagram of a video stream that is being stabilized by a video stabilization process. The figure includes three frames of a video 110a-c. These frames may be in succession, such that frame 110b may be the frame that was immediately captured after frame 110a was captured, and frame 110c may be the frame that was immediately captured after frame 110b was captured. This document may occasionally refer to two frames of a video as a first frame of a video and second frame of a video, but the "first" notation does not necessarily mean that the first frame is the initial frame in the entire video.

Frames 110a-c are shown positioned between or near lines 112a-b, which indicate a position of the scenes represented by the frames with respect to each other. The lines are provided in this figure to show that the camera was moving when it captured the frames 110a-c. For example, the camera was pointing more downwards when it captured frame 110b than when it captured frame 110a, and was pointing more upwards when it captured frame 110c than when it captured frames 110a-b.

A computing system identifies a mathematical transformation (box 120) that indicates movement of the camera from the first frame 110b to the second frame 110c. The identification may be performed using frames 110b-c (as illustrated by the arrows in the figure), where frame 110c may be the most-recently-captured frame. These two frames 110b-c may be received from a camera sensor or camera module that is attached to the computing system, or may be received from a remote device that captured the video frames 110b-c. The identification of the mathematical transformation may include generating the mathematical transformation. The mathematical transformation may be a homography transform matrix, as described in additional detail with respect to box 210 in FIGS. 2A-B.

A computing system then creates a modified transformation (box 125) by modifying the initial transformation (box 120) so that the modified transformation (box 125) is less representative than the initial transformation of movement that began recently. The modified transformation may be a low-pass filtered version of the initial transformation. Doing so results in a modified mathematical transformation (box 125) that is more representative than the initial transformation (box 120) of movement that has been occurring over a long period of time, in contrast to movement that began recently.

As an example, the modified mathematical transformation (box 125) may more heavily represent a panning motion that has been occurring for multiple seconds than an oscillation that began a fraction of a second ago. Modifying the transformation in this manner takes into account previous frames of the video, as illustrated by the arrows in FIG. 1 that point from frames 110a-b to box 122. For example, transformations calculated using the previous frames can be used to identify which movements have been occurring for a longer period of time, and which movements just began recently. An example way to use previous frames to calculate the modified transformation can be to apply a lowpass filter to the homography transform matrix, as described in additional detail with respect to box 220 in FIGS. 2A-B.

Box 130 shows a second transformation that is generated from the initial transformation (box 120) and the modified transformation (box 125). The second transformation may be a difference between the initial transformation and the modified transformation. Generating the second transformation from the initial transformation and the modified transformation is described in additional detail with respect to box 230 in FIGS. 2A-B.

Box 132 shows how a computing system identifies an anticipated distortion in a stabilized version of the second frame 110c that would result from applying the second transformation to the second frame 110c, based on a difference between (i) an amount of distortion in the horizontal direction that would result from applying the second mathematical transformation to the second frame 110c, and (ii) an amount of distortion in the vertical direction that would result from applying the second mathematical transformation to the second frame 110c. Calculating the anticipated distortion is described in additional detail with respect to box 250 in FIGS. 2A-B.

Box 134 shows how a computing system determines an amount by which to reduce a stabilizing effect that results from applying the second mathematical transformation to the second frame 110c, based on a degree to which the anticipated distortion exceeds an acceptable change in distortion. The acceptable change in distortion may be calculated using multiple frames of the video that preceded the second frame 110c, as illustrated by the arrows in FIG. 1 that point from frames 110a-b to box 134. As an example, the distortion in multiple previous frames may be analyzed, and if the distortion that would result from stabilizing the current frame 110c deviates significantly from an amount by which the distortion is changing from frame to frame, the computing system may reduce the stabilization of the current frame 110c to keep the distortion from being too apparent to a viewer of the video. Determining the amount by which to reduce the video stabilization is described in additional detail with respect to boxes 250 and 260 in FIG. 2. The use by the computing system of the determined amount by which to reduce the video stabilization may include generating a modified second transformation (box 140) using the determined amount.

The computing system generates the stabilized version of the second frame 110c (box 150) by applying the modified second transformation (box 140) to the second frame 110c. Since the modified second transformation (box 140) has been modified based on the determined amount by which to reduce the stabilization, the computing system's generation of the stabilized version of the second frame (box 150) is considered to have been reduced based on the determined amount by which to reduce the stabilization effect.

In some implementations, determining the amount by which to reduce the stabilizing effect is further or alternatively based on a determined speed of movement of the camera with respect to the scene from the first frame 110b to the second frame 110c exceeding an acceptable change in speed of the camera with respect to the scene. The acceptable change in speed of the camera may be calculated from multiple frames of the video that preceded the second frame 110c, as described in greater detail with respect to boxes 240 and 260 in FIGS. 2A-B.

In some implementations, generating the stabilized version of the second frame includes zooming into a version of the second frame that is generated by applying the second mathematical transformation to the second frame. The computing system can shift a zoomed-in region horizontally, vertically, or both to avoid the zoomed-in region from presenting an invalid region that may appear at the edges of the stabilized second frame. Doing so is described in greater detail with respect to boxes 280 and 290 in FIGS. 2A-B.

FIGS. 2A-B show a flowchart of a process for stabilizing video. This process is represented by boxes 210 through 290, which are described below. The operations described in association with those boxes may not have to be performed in the order listed below or shown in FIGS. 2A-B.

At box 210, the computing system estimates a matrix that represents the frame-to-frame motion ("H_interframe") using two video frames as input. This frame-to-frame motion matrix may be a homography transform matrix. A homography transform matrix may be a matrix that can represent the movement of a scene or a camera that was capturing a scene between two frames of a video. As an example, each frame of a video may display a two-dimensional image. Suppose that a first frame took a picture of a square from straight in front of the square, so that the square had equal-length sides with ninety-degree angles in the video frame (in other words it appeared square). Suppose now that the camera was moved to the side (or the square itself was moved) so that a next frame of the video displayed the square as skewed with some sides longer than each other and with angles that are not ninety degrees. The location of the four corner points of the square in the first frame can be mapped to the location of the four corner points in the second frame to identify how the camera or scene moved from one frame to the next.

The mapping of these corner points to each other in the frames can be used to generate a homography transform matrix that represents the motion of the camera viewpoint with respect to the scene that it is recording. Given such a homography transform matrix, a first frame can be used with the generated homography transform matrix to recreate the second frame, for example, by moving pixels in the first frame to different locations according to known homography transformation methods.

The homography transform matrix that is described above can represent not only translational movement, but also rotation, zooming, and non-rigid rolling shutter distortion. In this way, application of the homography transform matrix can be used to stabilize the video with respect to movement in eight degrees-of-freedom. To compare, some video stabilization mechanisms only stabilize images to account for translational movement (e.g., up/down and left/right movement).

The above-described homography transform matrix may be a 3×3 homography transform matrix, although other types of homography matrices may be used (and other mathematical representations of movement from one frame to another, even if not a homography matrix or even if not a matrix, may be used). The 3×3 matrix (referred to as H_interface) may be determined in the following manner. First, a computing system finds a set of feature points (usually corner points) in the current image, where those points are denoted [x'_i, y'_i], i=1 . . . N (N is the number of feature points). Then, corresponding feature points in the previous frame are found, where the corresponding feature points are denoted [x_i, y_i]. Note that the points are described as being in the GL coordinate system (i.e., the x and y ranges from −1 to 1 and with the frame center as the origin). If the points are in the image pixel coordinate system in which x ranges from 0 to the image width and y ranges from 0 to the image height, then the points can be transformed to the GL coordinate system or the resulting matrix can be transformed to compensate.

The above-described H_interfame matrix is a 3×3 matrix which contains 9 elements:

$$H\_interframe = \begin{matrix} h1, h2, h3 \\ h4, h5, h6 \\ h7, h8, h9 \end{matrix}$$

H_interfame is the transform matrix that transforms [x_i, y_i] into [x'_i, y'_i], as described below.

$$z'\_i*[x'\_i, y'\_i, 1]' = H\_interframe*[x\_i, y\_i, 1]'$$

[x'_i, y'_i, 1]' is a 3×1 vector which is the transpose of [x'_i, y'_i, 1] vector. [x_i, y_i, 1]' is a 3×1 vector which is the transpose of [x_i, y_i, 1] vector. z_i' is a scale factor.

Given a set of corresponding feature points, an example algorithm for estimating the matrix is described in the following computer vision book at algorithm 4.1 (page 91) and at algorithm 4.6 (page 123): "Hartley, R., Zisserman, A.: Multiple View Geometry in Computer Vision. Cambridge University Press (2000)," available at ftp://vista.eng.tau.ac.il/dropbox/aviad/Hartley,%20Zisserman%20-%20 Multiple%20View%20Geometry%20in%20Computer%20 Vision.pdf At box 220, the computing system estimates a lowpass transform matrix (H_lowpass). The lowpass transform matrix may later be combined with the H_interframe matrix to generate a new matrix (H_compensation) that can be used to remove the results of involuntary "high frequency" movement of the video camera. If the system attempted to remove all movement (in other words, did not do the lowpass filtering described herein), the user may not be able to move the camera voluntarily and have the scene depicted by the video also move. As such, the computing systems generates the lowpass transformation in order to filter out high frequency movements. High frequency movements may be those movements that are irregular and that are not represented through many frames, such as back and forth movements with a short period. To the contrary, low frequency movements may be those movements that are represented through many frames, such a user panning a video camera for multiple seconds.

To perform this filtering, the computing system generates a lowpass transform matrix (H_lowpass) that includes values weighted to emphasize the low frequency movements that have been occurring over a long time series. The lowpass transform matrix may be the result of applying a low-pass filter to the H_interframe matrix. Each element in the lowpass transform matrix is generated individually, on an element-by-element basis, from (1) its own time series of the lowpass transform matrix from the previous frame, (2) the H_interframe matrix that represents movement between the previous frame and the current frame, and (3) a dampening ratio that is specified by the user. In other words, the elements in the matrix that are weighted with notable values may be those elements that represent movement that has been present in the H_interframe matrix through many frames. The equation to generate H_lowpass may be represented as follows:

$$H\_lowpass = H\_previous\_lowapss * transform\_damping\_ratio + H\_interframe * (1 - transform\_damping\_ratio)$$

This equation is an example of a two-tap infinite impulse response filter.

At box 230, the computing system computes a compensation transform matrix (H_compensation). The compensation matrix may be a combination of the lowpass matrix (H_lowpass) and the frame-to-frame motion matrix (H_interframe). Combining these two matrices generates a matrix (H_compensation) that is needed to keep the movement from one frame to another, but only those movements that have been occurring for a reasonable period of time, to the exclusion of recent "involuntary" movements. The H_compensation matrix may represent the difference in movements between H_interfame and the H_lowpass, such that while H_lowpass could be applied to the last frame to generate a modified version of the last frame that represents the voluntary movements that occurred between the last frame to the current frame, H_compensation may be applied to the current frame to generate a modified (and stabilized) version of the current frame that represents the voluntary movements that occurred between the last frame and the current frame. In rough language, applying H_compensation the current frame removes the involuntary movement from that frame. Specifically, given this computed H_compensation matrix, the system should be able to take the current frame of the video, apply the H_compensation matrix to that frame with a transformation process, and obtain a newly-generated frame that is similar to the current frame, but that excludes any such sudden and small movement. In other words, the system attempts to keep the current frame as close as possible to the last frame, but permits long-term "voluntary" movements.

The compensation transform matrix may be generated with the following equation:

$$H\_compensation = Normalize(Normalize(Normalize(H\_lowpass) * H\_previous\_compensation) * Inverse(H\_interframe))$$

The H_previous_compensation matrix is the H_constrained_ compensation matrix that is calculated later on this process, but that which was calculated for the previous frame. Inverse( ) is the matrix inverse operation that is used to generate the original version of the last frame by inversing the transformation. Combining the original version of the last frame with the lowpass filter matrix permits the voluntary movements. Combining with H_previous_compensation compensates for the previous compensation value.

Normalize( ) is an operation that normalizes the 3×3 matrix by its second singular value. The normalization process is performed because some of the steps of the process may result in a transformation that, for lack of better words, would not make much sense in the real world. As such, a normalization process can make sure that a reasonable result is being obtained from each process step. The normalization is performed for each step of the process, so that an odd output from one step does not pollute the remaining steps of the process (e.g., imagine if the odd output provided a near-zero value that would pull the output of the rest of the steps to also be near-zero). For reasons that are discussed below, additional processing may enhance the results of the video stabilization process.

At box 240, the computing system computes a speed reduction value. The speed reduction value may be a value that is used to determine how much to reduce video stabilization when the camera moves very quickly and video stabilization becomes unwelcome because frame-to-frame motion may be unreliable. To calculate the amount by which the video stabilization may be reduced, the speed of movement between frames is initially calculated. In this example, the computing system generates the speed of the center of the frame. The speed in the x direction is pulled from the row 1 column 3 element in the H_interframe as follows (box 242):

$$speed\_x = H\_interframe[1,3] * aspect\_ratio$$

The speed in the y direction is pulled from the row 2, column 3 element in the H_interframe matrix, as follows (box 242):

$$speed\_y = H\_interframe[2,3]$$

The above-described aspect_ratio is the frame_width divided by the frame_height. These identifications of speed may only account for the translation movement between two frames, but speed may account for rotation, zooming, or other types of movements, in other examples.

The system may then determine the lowpass motion speed that accounts for the long-term speed of the camera (or the scene) and excludes sudden and quick "involuntary" movements. This is done by taking the current speed and combining it with the previously-calculated lowpass speed, and by further applying a damping ratio that inversely weights the current speed with respect to the previously-calculated lowpass speed, for example, as follows:

lowpass_speed_$x$=lowpass_speed_$x$_previous*
speed_damping_ratio+speed_$x$*
(1-speed_damping_ratio)

This equation in effect generates a lowpass speed by taking the previously-calculated speed and reducing it by an amount that is specified by a damping ratio. The reduction is compensated by the current speed. In this way, the current speed of the video affects the overall lowpass_speed value, but is not an exclusive factor in the lowpass_speed value. The above equation represents an infinite impulse response filter. The same process may be performed for the y speed to generate the lowpass y speed, for example, as follows:

lowpass_speed_$y$=lowpass_speed_$y$_previous*
speed_damping_ratio+speed_$y$*
(1-speed_damping_ratio)

The damping ratio in this process is set by a user, and an example value is 0.99.

The process then combines these values to generate a single representation of the lowpass speed that accounts for movement in the x and y directions, for example, using the following equation (box 244):

lowpass_speed=sqrt
(lowpass_speed_$x$*lowpass_speed_$x$+
lowpass_speed_$y$*lowpass_speed_$y$)

This calculated lowpass speed essentially represents the long-term speed of movement between frames. In other words, lowpass_speed accounts less for recent changes in speed and weights more heavily the longer-term speed trend.

With the lowpass speed calculated, the system can calculate the speed reduction value. In some examples, the speed reduction value is a value between 0 and 1 (other boundary values are possible), and the system may generate the speed reduction value based on how the lowpass speed compares to a low threshold and a high threshold. If the lowpass speed is below the low threshold, the speed reduction value may be set to the 0 boundary value. If the lowpass speed is above the high threshold, the speed reduction value may be set to the 1 boundary value. If the lowpass speed is between the two thresholds, the computing system may select a speed reduction value that represents the lowpass speed's scaled value between the thresholds, e.g., where the speed reduction value lies between the 0 and 1 boundary values. The calculation of the speed rejection value can be represented with the following algorithm (box 246):

If lowpass_speed<low_speed_threshold,then speed_
reduction=0

Else if lowpass_speed>high_speed_threshold,then
speed_reduction=max_speed_reduction Otherwise, speed_reduction=max_speed_reduction*
(lowpass_speed−low_speed_threshold)/(high_
speed_threshold−low_speed_threshold)

With this algorithm, the low_speed_threshold, high_speed_threshold, and max_speed_reduction are all specified by the user. Example values include low_speed_threshold=0.008; high_speed_threshold=0.016; and max_speed_reduction=1.0.

At box 250, the computing system calculates a distortion reduction value. The computing system may calculate a distortion reduction value because the compensation transform may create too much non-rigid distortion when applied to a video frame. In other words, the video stabilization may not appear realistic, for example, because the distortion caused by stretching the image in one direction more than another may occur too quickly and could appear unusual to a user.

To calculate the distortion reduction value, the computing system may first compute the compensation zoom factor by looking to the values for the zoom factors in the H_compensation matrix, as follows:

zoom_$x$=H_compensation[1,1] which is the row 1
column 1 element in the H_compensation
matrix zoom_$y$=H_compensation[2,2] which is the row 2
column 2 element in the H_compensation
matrix The zoom factors may be those factors that identify how the transformation stretches the image in a dimension.

The computing system may then determine the difference between the two zoom factors, to determine the degree to which the image is being distorted by stretching more in one direction than the other, as follows (box 252):

distortion=abs(zoom_$x$−zoom_$y$)

A lowpass filter is applied to the distortion, to place a limit on the rate at which the distortion is permitted to change and therefore to make sure that sudden changes in distortion minimized, using the following formula (box 254):

lowpass_distortion=previous_lowpass_distortion*
distortion_damping_ratio+distortion*
(1-distortion_damping_ratio)

Stated another way, the algorithm is arranged to allow the amount of distortion to change slowly. In the above formula, the distortion_damping_ratio is the damping ratio for the distortion IIR filter that is specified by the user. An example value is 0.99.

With the lowpass distortion calculated, the computing system can calculate the distortion reduction value. In some examples, the distortion reduction value is a value between 0 and 1 (other boundary values are possible), and the system may generate the distortion reduction value based on how the lowpass distortion compares to a low threshold and a high threshold. If the lowpass distortion is below the low threshold, the lowpass reduction value may be set to the 0 boundary value. If the lowpass distortion value is above the high threshold, the distortion reduction value may be set to the 1 boundary value. If the lowpass distortion value is between the two thresholds, a value may be selected that represents the lowpass distortion's scaled value between the thresholds (e.g., where the resulting distortion reduction value lies between the 0 and 1 boundary values). The calculation of the distortion reduction value can be represented with the following algorithm (box 256):

If lowpass_distortion<low_distortion_threshold,then
distortion_reduction=0

Else if lowpass_distortion>high_distortion_threshold,
then max_distortion_reduction Otherwise,
distortion_reduction=max_distortion_reduction*
(lowpass_distortion−low_distortion_threshold)/
(high_distortion_threshold−
low_distortion_threshold)

With this algorithm, low_distortion_threshold, high_distortion_threshold, and max_distortion_reduction are all specified by the user. Example values include low_distortion_threshold=0.001, high_distortion_threshold=0.01, and max_distortion_reduction=0.3.

At box 260, the computing system reduces a strength of the video stabilization based on the determined speed reduction value and distortion reduction value. To do this, the computing system calculates a reduction value, which in this example is identified as a maximum of the speed reduction value and the distortion reduction value (box 262), as follows:

reduction=max(speed_reduction,distortion_reduction)

In other examples, the reduction value may be a combination of these two values that accounts for a portion of each value (e.g., the values may be added or multiplied together, and possibly then multiplied by a predetermined number such as 0.5). The reduction value may fall at or between the boundary values of 0 and 1, and the closer that the reduction value is to 1, the more that the computing system may reduce the strength of the image stabilization.

The computing system may then modify the compensation transform matrix to generate a reduced compensation transform matrix (box 264). The computing system may do this by multiplying the compensation transform matrix by a subtraction of the reduction value from one. In other words, if the reduction value is very near one (indicating that there is to be a great reduction in image stabilization), the values in the compensation matrix may be significantly diminished because they would be multiplied by a number near zero. The numbers in the modified compensation transform matrix are then added to an identity matrix that has been multiplied by the reduction value. An example equation follows:

H_reduced_compensation=Identity*reduction+ H_compensation*(1−reduction)

At box 270, the computing system may constrain the compensation so that resulting video stabilization does not show invalid regions of the output frame (e.g., those regions that are outside of the frame). As some background, because the compensation may warp the image that results from the image stabilization process, that image may display invalid regions that are essentially outside of the image at its borders. To make sure that these invalid regions are not shown, the computing system may zoom into the image to crop out sides of the image that could include the invalid regions.

Getting back to the processes of box 270, if the camera is moved quickly and significantly, the stabilization could lock into displaying an old location because the quick and significant movement may be filtered out, which may introduce the above-described invalid regions into the display of a stabilized frame. In such a case, the below-described constraint process can ensure that the video stabilization essentially stops fully-controlling the region of the frame that is displayed if the video would be about to display an invalid region. This determination regarding whether the stabilization needs to give up some control of the frame may start by initially setting the corner points of the output image and determining if those corner points fall outside of a pre-specified cropping region. A maximum amount of compensation and zooming may be defined as twice the cropping ratio, where the cropping ratio may be specified by a user (e.g., to be 15% on each side, or 0.15 in the below equation):

max_compensation=cropping_ratio*2

The computing system may then use the H_reduced_compensation matrix to transform the 4 corners of a unit square in GL coordinate (x01, y01)=(−1, −1), (x02, y02)=(1, −1), (x03, y03)=(−1,1), (x04, y04)=(1,1) to the 4 corner points (x1, y1), (x2, y2), (x3, y3), (x4, y4). (Note that the video frame does not need to be a unit square, but the dimensions of the unit frame are mapped to a unit square in GL coordinate). More specifically, we use the following formula to transform (x0i, y0i) into (xi, yi):

$dzi*[xi,yi,1]'=H\_reduced\_compensation*[x0i,y0i,1]'$

In this example, [x0i, y0i, 1]' is a 3×1 vector which is the transpose of the [x0i, y0i, 1] vector. [xi, yi, 1]' is a 3×1 vector which is the transpose of [xi, yi, 1] vector. zi is a scale factor.

The computing system may then identify the maximum amount of displacement in each direction (left, right, up, and down) from the corners of each transformed video frame to the edge of the unit square, as follows:

max_left_displacement=1+max(x1,x3)

max_right_displacement=1−min(x2,x4)

max_top_displacement=1+max(y1,y2)

max_bottom_displacement=1−min(y3,y4)

If any of the identified displacements exceed the maximum amount of compensation (which is twice the cropping ratio as described above, and which would indicate that the invalid regions are in the displayed region of the zoomed-in region of the unit square), then the corner points of the frame are shifted by a same amount away from the edge of the unit square so that the invalid regions will not be displayed. Equations for shifting the corner points accordingly follow:

max_left_displacement>max_compensation, shift the 4 corner points left by max_left_displacement− max_compensation If max_right_displacement>max_compensation, shift the 4 corner points right by max_right_displacement−max_compensation If max_top_displacement>max_compensation, shift the 4 corner points up by max_top_displacement−max_compensation If max_bottom_displacement>max_compensation, shift the 4 corner points down by max_bottom_displacement−max_compensation.

Shifting the corner points is an identification that invalid regions would have been shown even if the display was cropped (box 272).

After all of the above shifting operations, the 4 new corner points may be denoted (x1', y1'), (x2', y2'), (x3', y3'), (x4', y4'). The computing system then computes the constrained compensation transform matrix H_constrained_compensation, which maps the four corners of a unit square in GL coordinate (x01, y01)=(−1, −1), (x02, y02)=(1, −1), (x03, y03)=(−1,1), (x04, y04)=(1,1) to the 4 constrained corner points (x1', y1'), (x2', y2'), (x3', y3'), (x4', y4'), as follows:

$zi'*[xi',yi',1]'=H\_constrained\_compensation*[x0i,y0i,1]'$

In this example, [x0i, y0i, 1]' is a 3×1 vector which is the transpose of [x0i, y0i, 1] vector. [xi', yi', 1]' is a 3×1 vector which is the transpose of [xi', yi', 1] vector. zi' is a scale factor. Given 4 pairs of points [x0i, y0i, 1]' and [xi', yi', 1]', an example algorithm for estimating the matrix is described in the following computer vision book at algorithm 4.1 (page 91): "Hartley, R., Zisserman, A.: Multiple View Geometry in Computer Vision. Cambridge University Press (2000)," available at ftp://vista.eng.tau.ac.il/dropbox/aviad/Hartley,%20Zisserman%20-%20Multiple%20View%20Geometry%20in%20Computer%20Vision.pdf The H_constrained_compensation is then saved as H_previous_compensation, which may be used in computations for stabilizing the next frame, as described above with respect to box 230.

At box 280, the computing system modifies the constrained compensation matrix so that the stabilized image will be zoomed to crop the border. In some examples, the computing system first identifies a zoom factor as follows:

$$zoom\_factor=1/(1-2*cropping\_ratio)$$

In doing so, the computing system doubles the crop ratio (e.g., by doubling the 15% value of 0.15 to 0.3), subtracting the resulting value from 1 (e.g., to get 0.7), and then dividing 1 by that result to get the zoom factor (e.g., 1 divided by 0.7 to equal a 1.42 zoom factor). The computing system may then divide certain features of the the constrained compensation matrix in order to zoom into the display a certain amount, as follows:

$$H\_constrained\_compensation[3,1]=H\_constrained\_compensation[3,1]/zoom\_factor$$

$$H\_constrained\_compensation[3,2]=H\_constrained\_compensation[3,2]/zoom\_factor$$

$$H\_constrained\_compensation[3,3]=H\_constrained\_compensation[3,3]/zoom\_factor$$

At box 290, the computing system applies the modified constrained compensation matrix to the current frame in order to generate a cropped and stabilized version of the current frame. An example way to apply the constrained compensation matrix (H_constrained_compensation) on the input frame to produce the output image can be described as follows.

z'*[x', y', 1]'=H_constrained_compensation*[x, y, 1]'
[x, y, 1]' is a 3×1 vector that represents a coordinate in the input frame
[x', y', 1]' is a 3×1 vector that represents the coordinate in the output frame
z' is a scale factor
H_constrained_compensation is a 3×3 matrix which contains 9 elements:

$$H\_constrained\_compensation = \begin{matrix} h1, h2, h3 \\ h4, h5, h6 \\ h7, h8, h9 \end{matrix}$$

In additional detail, for each pixel [x, y] in the input frame, find the position [x', y'] in the output frame using the above transformation, and copy the pixel value from [x, y] in the input frame to [x', y'] in the output frame. Another way is for each pixel [x', y'] in the output frame, find the position [x, y] in the input frame using the inverse transformation, and copy the pixel value from [x, y] in the input image to [x', y'] in the output frame. These operations may be performed in the computing systems Graphics Processing Unit (GPT) efficiently.

The process described herein for boxes 210 through 290 may then repeated for the next frame, with some of the values from processing the current frame being used for the next frame.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

In various implementations, operations that are described as being performed on a matrix means operations that are performed on that matrix or a version of that matrix that has been modified by an operation described in this disclosure or an equivalent thereof.

Figure 3:
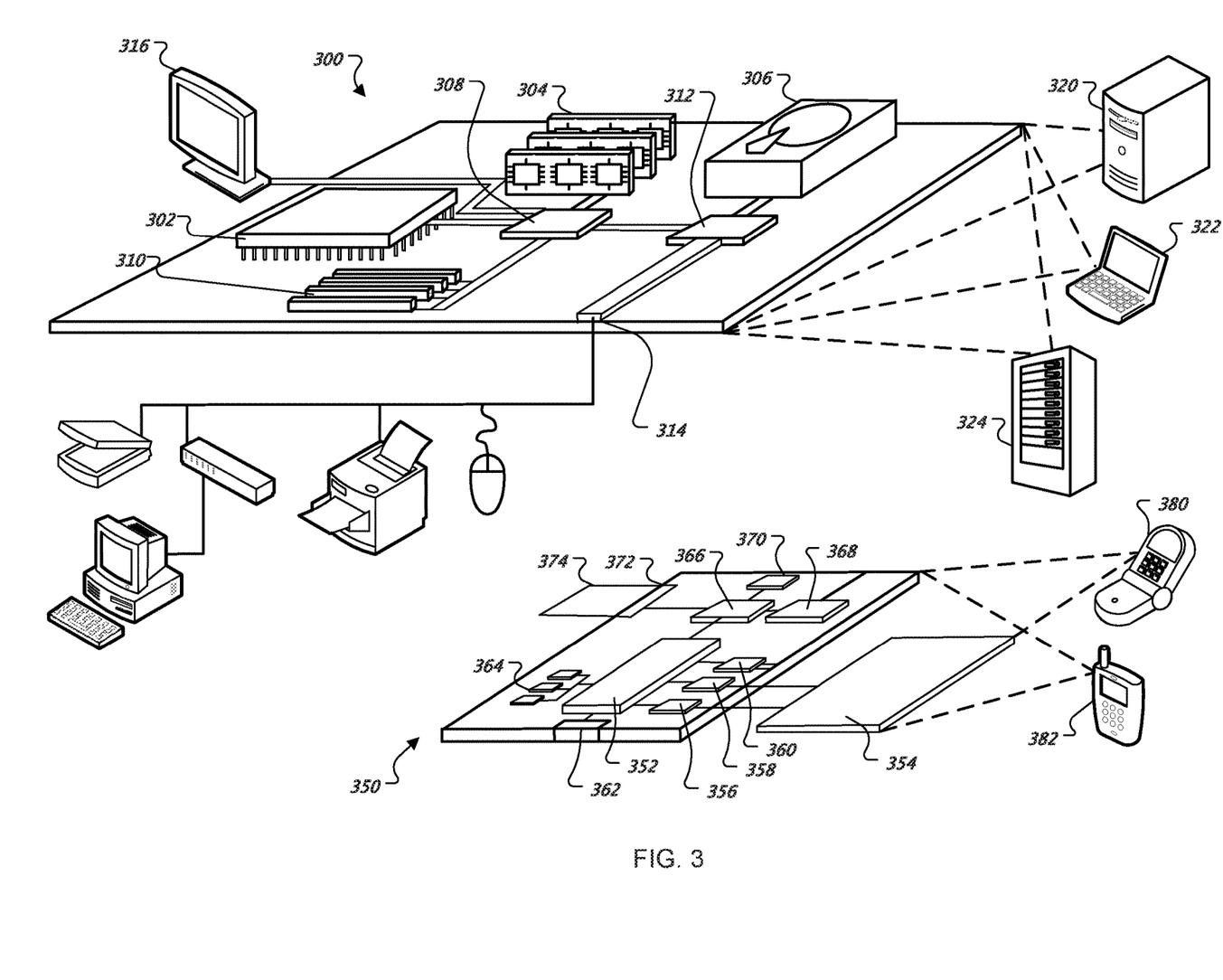
FIG. 3 is a block diagram of computing devices that may be used to implement the systems and methods described in this document, as either a client or as a server or plurality of servers.

FIG. 3 is a block diagram of computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low speed controller 312 manages lower bandwidth-intensive operations. Such allocation of functions is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provided, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Additionally computing device 300 or 350 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims

What is claimed is:

1. A computer-implemented method, comprising:
receiving, by a computing system, a first frame and a second frame of a video that was captured by a camera;
determining, by the computing system, a first indication of movement of the camera with respect to a scene that was captured by the video from when the first frame was captured by the camera to when the second frame was captured by the camera, representing both movement of the camera with respect to the scene that began recently and movement of the camera with respect to the scene that has been occurring over a longer term;
determining, by the computing system, a second indication of the movement of the camera with respect to the scene that has been occurring over the longer term;
determining, by the computing system, a third indication of the movement of the camera with respect to the scene that began recently, by comparing:
(i) the first indication of the movement of the camera with respect to the scene from when the first frame was captured by the camera to when the second frame was captured by the camera, representing both the movement of the camera with respect to the scene that began recently and the movement of the camera with respect to the scene that has been occurring over the longer term, and
(ii) the second indication of the movement of the camera with respect to the scene that has been occurring over the longer term; and
generating, by the computing system through use of the third indication of the movement of the camera with respect to the scene that began recently, a stabilized version of the second frame by modifying a virtual position of the camera with respect to the scene in the second frame to remove recent camera movement and leave longer-term camera movement.

2. The computer-implemented method of claim 1, wherein the second frame is a frame of the video that immediately follows the first frame of the video.

3. The computer-implemented method of claim 1, wherein the computing system generates the stabilized version of the second frame without taking into account movement of the camera with respect to the scene from future frames of the video to follow the first frame and the second frame of the video.

4. The computer-implemented method of claim 1, wherein:
the first indication of the movement of the camera with respect to the scene comprises a first homography transformation matrix;
the second indication of the movement of the camera with respect to the scene comprises a second homography transformation matrix; and the third indication of the movement of the camera with respect to the scene comprises a third homography transformation matrix.

5. The computer-implemented method of claim 1, wherein generating the stabilized version of the second frame includes zooming into a version of the second frame that was generated by applying the third indication of the movement of the camera to the second frame.

6. The computer-implemented method of claim 1, wherein determining the first indication of the movement of the camera with respect to the scene includes identifying how a feature present in the first frame and the second frame moved between the first frame and the second frame.

7. The computer-implemented method of claim 1, wherein determining the second indication of the movement of the camera with respect to the scene that has been occurring over the longer term includes identifying how a feature present in frames of the video that the camera captured before the first frame and the second frame moved in the frames of the video that the camera captured before the first frame and the second frame.

8. The computer-implemented method of claim 1, further comprising:
   identifying, by the computing system, an anticipated distortion that would be present in a stabilized version of the second frame that results from application of the third indication of the movement of the camera to the second frame, based on a difference between:
   (i) an amount of distortion in a horizontal direction resulting from application of the third indication of the movement of the camera to the second frame, and
   (ii) an amount of distortion in a vertical direction resulting from application of the third indication of the movement of the camera to the second frame;
   determining, by the computing system, an amount by which to reduce a stabilizing effect that results from application of the third indication of the movement of the camera to the second frame, based on an amount by which the anticipated distortion exceeds an acceptable level of distortion,
   wherein generating the stabilized version of the second frame includes reducing the stabilizing effect that results from application of the third indication of the movement of the camera to the second frame based on the determined amount.

9. The computer-implemented method of claim 8, further comprising determining, by the computing system, the acceptable level of distortion based on analysis of distortion present in multiple frames of the video that preceded the second frame.

10. The computer-implemented method of claim 1, further comprising:
   determining, by the computing system, a speed of movement of the camera with respect to the scene represented by movement between capture of the first frame and capture of the second frame of the video;
   determining, by the computing system, an acceptable change in speed of movement of the camera with respect to the scene based on analysis of speed of movement of the camera with respect to the scene represented by movement through capture of multiple frames of the video that preceded the first frame and the second frame; and
   determining, by the computing system, an amount by which to reduce a stabilizing effect that results from application of the third indication of the movement of the camera to the second frame, based on an amount by which the speed of movement of the camera represented by the movement between capture of the first frame and capture of the second frame of the video exceeds the acceptable change in speed of movement of the camera,
   wherein generating the stabilized version of the second frame includes reducing the stabilizing effect that results from application of the third indication of the movement of the camera to the second frame based on the determined amount.

11. One or more non-transitory computer-readable devices including instructions that, when executed by one or more processors, cause performance of operations that include:
   receiving, by a computing system, a first frame and a second frame of a video that was captured by a camera;
   determining, by the computing system, a first indication of movement of the camera with respect to a scene that was captured by the video from when the first frame was captured by the camera to when the second frame was captured by the camera, representing both movement of the camera with respect to the scene that began recently and movement of the camera with respect to the scene that has been occurring over a longer term;
   determining, by the computing system, a second indication of the movement of the camera with respect to the scene that has been occurring over the longer term;
   determining, by the computing system, a third indication of the movement of the camera with respect to the scene that began recently, by comparing:
   (i) the first indication of the movement of the camera with respect to the scene from when the first frame was captured by the camera to when the second frame was captured by the camera, representing both the movement of the camera with respect to the scene that began recently and the movement of the camera with respect to the scene that has been occurring over the longer term, and
   (ii) the second indication of the movement of the camera with respect to the scene that has been occurring over the longer term; and
   generating, by the computing system through use of the third indication of the movement of the camera with respect to the scene that began recently, a stabilized version of the second frame by modifying a virtual position of the camera with respect to the scene in the second frame to remove recent camera movement and leave longer-term camera movement.

12. The one or more non-transitory computer-readable devices of claim 11, wherein the second frame is a frame of the video that immediately follows the first frame of the video.

13. The one or more non-transitory computer-readable devices of claim 11, wherein the computing system generates the stabilized version of the second frame without taking into account movement of the camera with respect to the scene from future frames of the video to follow the first frame and the second frame of the video.

14. The one or more non-transitory computer-readable devices of claim 11, wherein:
   the first indication of the movement of the camera with respect to the scene comprises a first homography transformation matrix;
   the second indication of the movement of the camera with respect to the scene comprises a second homography transformation matrix; and the third indication of the movement of the camera with respect to the scene comprises a third homography transformation matrix.

15. The one or more non-transitory computer-readable devices of claim 11, wherein generating the stabilized version of the second frame includes zooming into a version of the second frame that was generated by applying the third indication of the movement of the camera to the second frame.

16. The one or more non-transitory computer-readable devices of claim 11, wherein determining the first indication of the movement of the camera with respect to the scene includes identifying how a feature present in the first frame and the second frame moved between the first frame and the second frame.

17. The one or more non-transitory computer-readable devices of claim 11, wherein determining the second indication of the movement of the camera with respect to the scene that has been occurring over the longer term includes identifying how a feature present in frames of the video that the camera captured before the first frame and the second frame moved in the frames of the video that the camera captured before the first frame and the second frame.

18. The one or more non-transitory computer-readable devices of claim 11, wherein the operations further comprise:
   identifying, by the computing system, an anticipated distortion that would be present in a stabilized version of the second frame that results from application of the third indication of the movement of the camera to the second frame, based on a difference between:
      (i) an amount of distortion in a horizontal direction resulting from application of the third indication of the movement of the camera to the second frame, and
      (ii) an amount of distortion in a vertical direction resulting from application of the third indication of the movement of the camera to the second frame;
   determining, by the computing system, an amount by which to reduce a stabilizing effect that results from application of the third indication of the movement of the camera to the second frame, based on an amount by which the anticipated distortion exceeds an acceptable level of distortion,
   wherein generating the stabilized version of the second frame includes reducing the stabilizing effect that results from application of the third indication of the movement of the camera to the second frame based on the determined amount.

19. The one or more non-transitory computer-readable devices of claim 18, wherein the operations further comprise determining, by the computing system, the acceptable level of distortion based on analysis of distortion present in multiple frames of the video that preceded the second frame.

20. The one or more non-transitory computer-readable devices of claim 11, wherein the operations further comprise:
   determining, by the computing system, a speed of movement of the camera with respect to the scene represented by movement between capture of the first frame and capture of the second frame of the video;
   determining, by the computing system, an acceptable change in speed of movement of the camera with respect to the scene based on analysis of speed of movement of the camera with respect to the scene represented by movement through capture of multiple frames of the video that preceded the first frame and the second frame; and
   determining, by the computing system, an amount by which to reduce a stabilizing effect that results from application of the third indication of the movement of the camera to the second frame, based on an amount by which the speed of movement of the camera represented by the movement between capture of the first frame and capture of the second frame of the video exceeds the acceptable change in speed of movement of the camera,
   wherein generating the stabilized version of the second frame includes reducing the stabilizing effect that results from application of the third indication of the movement of the camera to the second frame based on the determined amount.

* * * * *